US008788457B2

(12) United States Patent
Parees et al.

(10) Patent No.: US 8,788,457 B2
(45) Date of Patent: *Jul. 22, 2014

(54) ENSURING THAT THE ARCHIVAL DATA DELETED IN RELATIONAL SOURCE TABLE IS ALREADY STORED IN RELATIONAL TARGET TABLE

(75) Inventors: Benjamin Michael Parees, Durham, NC (US); David Michael Eads, Raleigh, NC (US); David Michael Enyeart, Raleigh, NC (US); Luis Eduardo Guillen-Sanchez, Raleigh, NC (US); Latha Sivakumar, Chapel Hill (IN); Dan McBryde Willey, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1712 days.

This patent is subject to a terminal disclaimer.

(21) Appl. No.: 11/858,937

(22) Filed: Sep. 21, 2007

(65) Prior Publication Data
US 2009/0083341 A1 Mar. 26, 2009

(51) Int. Cl.
G06F 7/00 (2006.01)
G06F 17/00 (2006.01)

(52) U.S. Cl.
USPC ........................................................ 707/610

(58) Field of Classification Search
USPC ............................................... 707/200, 610
See application file for complete search history.

(56) References Cited

U.S. PATENT DOCUMENTS

| 5,758,355 A * | 5/1998 | Buchanan ..................... 707/201 |
| 6,529,921 B1 | 3/2003 | Berkowitz et al. ......... 707/500.1 |
| 6,606,626 B1 * | 8/2003 | Ponnekanti ...................... 707/8 |
| 6,934,727 B2 | 8/2005 | Berkowitz et al. ......... 707/500.1 |
| 6,938,031 B1 * | 8/2005 | Zoltan et al. ...................... 707/1 |
| 2002/0087561 A1 * | 7/2002 | Ching Chen et al. ......... 707/100 |
| 2003/0172070 A1 * | 9/2003 | Sawadsky et al. ............. 707/10 |
| 2006/0085485 A1 * | 4/2006 | Shimshoni .................... 707/200 |
| 2006/0161606 A1 * | 7/2006 | Biswal et al. ................. 707/204 |
| 2006/0218405 A1 * | 9/2006 | Ama et al. ..................... 713/181 |
| 2006/0277223 A1 * | 12/2006 | Gupta et al. .................. 707/201 |

OTHER PUBLICATIONS

Office Action for U.S. Appl. No. 11/858,931 dated Oct. 26, 2009.
Office Action from U.S. Appl. No. 11/858,931 dated Mar. 18, 2010.

* cited by examiner

Primary Examiner — Charles Lu
(74) Attorney, Agent, or Firm — Robert A. Voigt, Jr.; Winstead, P.C.

(57) ABSTRACT

A method, system and computer program product for ensuring that archival data deleted in a source table is already stored in a target table. An external data source sets a flag in the first table to identify the row in the source table to be deleted. An application sets a flag in a second table for each row of the source table that is marked to be deleted according to the first table. The application performs uncommitted read operations on the source table for each row corresponding to the distinct primary key values stored in the first table. The application inserts the data read into the corresponding rows of the target table. The application deletes the rows in the source table indicated to be deleted by the second table. In this manner, the archival data deleted from the source table is ensured to already be stored in the target table.

20 Claims, 7 Drawing Sheets

SOURCE TABLE 102

| MARKED FOR DELETE | PRIMARY KEYS | CREATION TIME | PROCESS STATE | DATA |
|---|---|---|---|---|
| | 1 | 2007-04-14 01:06:28.328001 | STARTED | <PROCESSDATA> |
| | 2 | 2007-04-14 01:06:28.328000 | INACTIVE | <PROCESSDATA> |

TARGET TABLE 103

| PRIMARY KEYS | CREATION TIME | PROCESS STATE | DATA |
|---|---|---|---|
| 1 | 2007-04-14 01:06:28.328001 | STARTED | <COPIEDDATA> |
| 3 | 2007-04-14 01:06:28.328004 | COMPLETED | <COPIEDDATA> |
| 2 | 2007-04-14 01:06:28.328000 | INACTIVE | <COPIEDDATA> |

CHANGE LOG TABLE 105

| MARKED FOR DELETE | PRIMARY KEYS |
|---|---|
| | 1 |
| | 3 |
| 1 | 1 |

CHANGE LOG COPY TABLE 106

| MARKED FOR DELETE | PRIMARY KEYS |
|---|---|
| | 1 |
| | 3 |
| 1 | |

FIG. 7

ENSURING THAT THE ARCHIVAL DATA DELETED IN RELATIONAL SOURCE TABLE IS ALREADY STORED IN RELATIONAL TARGET TABLE

CROSS REFERENCE TO RELATED APPLICATIONS

The present invention is related to the following U.S. patent application which is incorporated herein by reference:

Ser. No. 11/858,931 entitled "Performing Synchronization Among Relational Database Tables with Minimal Contention" filed Sep. 21, 2007.

TECHNICAL FIELD

The present invention relates to relational databases, and more particularly to ensuring that the archival data deleted in the relational source table is already stored in the relational target table.

BACKGROUND INFORMATION

A database may be defined as a structured collection of records or data that is stored in a computer so that a program can consult it to answer queries. The records retrieved in answer to queries become information that may be used to make decisions. The computer program used to manage and query a database may be referred to as a database management system.

Typically, for a given database, there is a structural description of the type of facts held in the database. The structural description may be referred to as a "schema." The schema describes the objects that are represented in the database, and the relationships among them. There are a number of different ways of organizing a schema, that is, of modeling the database structure. These are known as database models or data models. One such model is referred to as the "relational model." The relational database model represents all information in the form of multiple related tables each consisting of rows and columns. The relational database model represents relationships by the use of values common to more than one table.

As discussed above, a database, such as a relational database, may include tables each consisting of rows and columns. One or more of these tables may be referred to as a "source table(s)." A source table refers to the table that includes the latest data populated by an external data source. For example, an application taking online orders may be populating the source table with order information (e.g., the product being purchased, the credit card number of the buyer, etc).

Further, one or more of the tables in the database, such as a relational database, may be referred to as a "target table(s)." A target table may refer to a table that serves as a back-up table to the source table. Hence, there is an effort in ensuring that the data in the target table is current and consistent with the data in the source table. The process in ensuring that the data in the target table is current and consistent with the data in the source table may be referred to as "synchronization." Further, the target table may be said to store "archival data" where "archival data" may refer to data that is no longer necessary to be stored in the source table (archival data is to be deleted from the source table) but is still valuable for later use (e.g., analysis is performed on the archival data to determine marketing trends).

Synchronization may occur by having an application of the database management system reading a log which indicates the changes to the source data (data in the source table) and then mirroring those changes into the target table. Alternatively, synchronization may also occur by performing Structured Query Language (SQL) queries for retrieving the data in the entire source table and then updating the entire target table with the retrieved data.

However, when a row(s) of archival data is deleted from the source table during such synchronization methods, the archival data stored in the deleted rows may not have already been stored in the target table. That is, archival data may be deleted from the source table prior to being stored in the target table thereby preventing the target table from storing the archival data.

Therefore, there is a need in the art to ensure that the data deleted in the relational source table is already stored in the relational target table.

SUMMARY

The problems outlined above may at least in part be solved in some embodiments by having an external data source set a flag in a table (referred to herein as the "change log table") to identify the row in the source table to be deleted. Further, the external data source inserts a new row in the change log table as the external data source modifies or creates a row in the source table, where each new row in the change log table includes a primary key value associated with the modified/created row in the source table. An application copies the distinct values for the primary keys listed in the change log table and inserts them in a second table (referred to herein as the "change log copy table"). That is, the application copies the values for each unique primary key listed in the table and inserts them in the second table. Hence, if a primary key value were listed more than once in the change log table, only a single instance of the primary key value would be copied and inserted in the change log copy table. Further, the application sets a flag in the change log copy table for each row of the source table that is marked to be deleted according to the change log table. The application may then perform uncommitted read operations on the source table for each row corresponding to the primary key values stored in the change log copy table. The application may then insert the data read into the corresponding rows of the target table. The application may then delete the rows in the source table indicated to be deleted by the change log copy table. By being able to first read the data from the rows in the source table to be deleted and then update the target table with such data read from the source table prior to deleting those rows from the source table, the archival data deleted from the source table is ensured to already be stored in the target table.

In one embodiment of the present invention, a method for ensuring that archival data deleted in a source table is already stored in a target table, the method comprising the step of locking one or more rows in a first table, where the first table stores one or more primary key values associated with one or more rows in the source table that have been one of modified and created by an external data source, where the first table further stores an indication of deleting one or more rows in the source table associated with one or more of the one or more primary key values. The method further comprises copying distinct values for the one or more primary keys from the first table. The method additionally comprises inserting the copied distinct values for the one or more primary keys into one or more rows of a second table. Additionally, the method comprises setting one or more flags in the second table associated with the one or more rows in the source table to be deleted according to the first table. Furthermore, the method comprises deleting the one or more rows in the source table indicated by the second table according to the setting of the one or more flags.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 7 is an illustrative example of the contents stored in the source table, the target table, the change log table and the change log copy table during the execution of the method of FIGS. 6A-B in accordance with an embodiment of the present invention.

DETAILED DESCRIPTION

The present invention comprises a method, system and computer program product for ensuring that archival data deleted in a source table is already stored in a target table. In one embodiment of the present invention, an external data source (e.g., online ordering application) sets a flag in a table (referred to herein as the "change log table") to identify the row in the source table to be deleted. Further, the external data source inserts a new row in the change log table as the external data source modifies or creates a row in the source table, where each new row in the change log table includes a primary key value associated with the modified/created row in the source table. An application copies the distinct values for the primary keys listed in the change log table and inserts them in a second table (referred to herein as the "change log copy table"). That is, the application copies the values for each unique primary key listed in the table and inserts them in the second table. Hence, if a primary key value were listed more than once in the change log table, only a single instance of the primary key value would be copied and inserted in the change log copy table. Further, the application sets a flag in the change log copy table for each row of the source table that is marked to be deleted according to the change log table. The application may then perform uncommitted read operations on the source table for each row corresponding to the primary key values stored in the change log copy table. The application may then insert the data read into the corresponding rows of the target table. The application may then delete the rows in the source table indicated to be deleted by the change log copy table. By being able to first read the data from the rows in the source table to be deleted and then update the target table with such data read from the source table prior to deleting those rows from the source table, the archival data deleted from the source table is ensured to already be stored in the target table.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
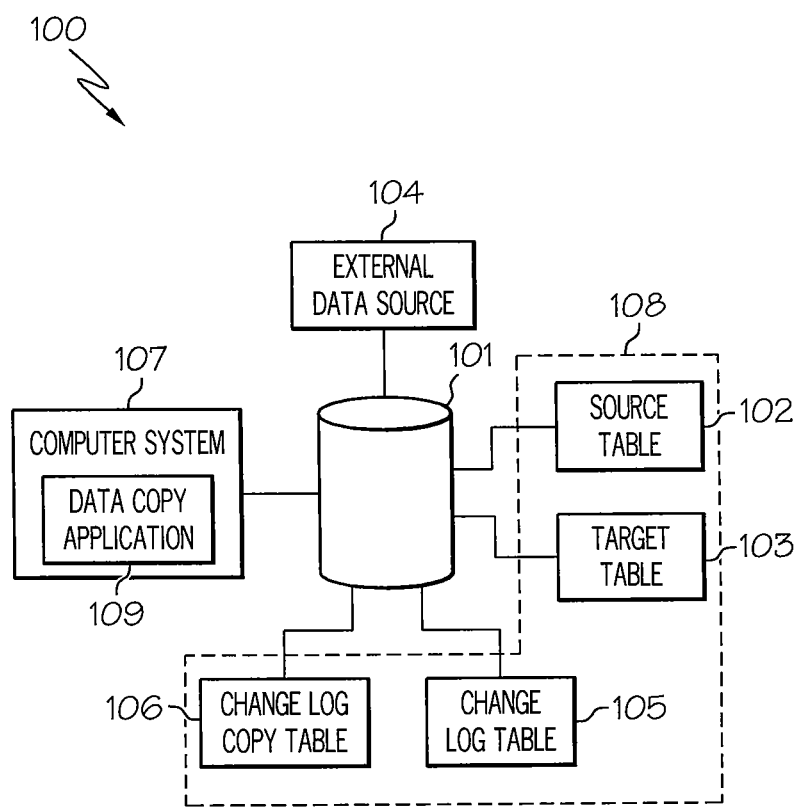
FIG. 1 illustrate a database system in accordance with an embodiment of the present invention.

FIG. 1—Database System

FIG. 1 illustrates an embodiment of the present invention of a database system 100 for storing, retrieving and updating data. Database system 100 includes a database 101 configured to store a collection of records or data. In one embodiment, database 101 is a relational database which represents all information or data in the form of multiple related tables each consisting of rows and columns. Database 101 includes several tables, including those indicated within the dashed lines of element 108. For example, database 101 includes source table 102 and target table 103. Source table 102 may refer to a table that includes data populated by an external data source 104 (e.g., online order application) connected to database 101. Target table 103 may refer to a table that serves as a back-up table to source table 102. The process in ensuring that the data in target table 103 is current and consistent with the data stored in source table 102 is referred to herein as "synchronization." Further, target table 103 may be said to store "archival data" where "archival data" may refer to data that is no longer necessary to be stored in source table 102 (archival data is to be deleted from source table 102) but is still valuable for later use (e.g., analysis is performed on the archival data to determine marketing trends). It is noted that database system 100 may include any number of source tables 102 and target tables 103 and that FIG. 1 is illustrative.

Database 101 may further include the tables referred to herein as the "change log table" 105 and the "change log copy table" 106. Tables 105, 106 are used to allow an application, referred to herein as the "data copy application 109," to ensure that archival data deleted in source table 102 is already stored in target table 103 while performing synchronization between source table 102 and target table 103 in an efficient manner that minimizes the contention at source table 102 as discussed further below in connection with FIGS. 3-7.

Database system 100 further includes a computer system 107 connected to database 101. Computer system 107 may include a database management system software configured to manage and query database 101 as well as include application 109 ("data copy application") that is platform agnostic that ensures that archival data deleted in source table 102 is already stored in target table 103 while performing synchronization between source table 102 and target table 103 in an efficient manner that minimizes the contention at source table 102. A more detail description of computer system 107 is provided below in connection with FIG. 2.

Figure 2:
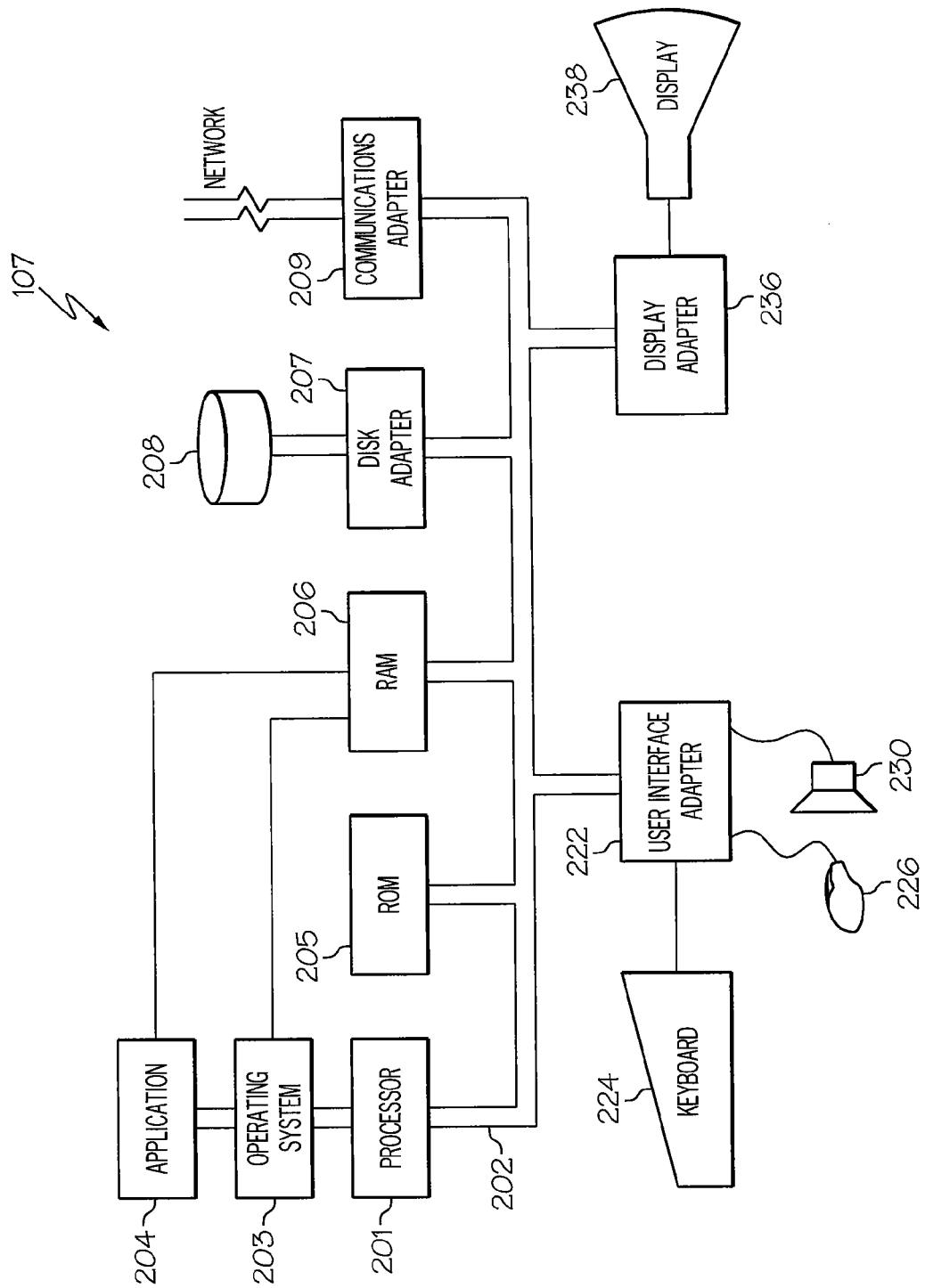
FIG. 2 illustrates a hardware configuration of a computer system in accordance with an embodiment of the present invention.

FIG. 2—Computer System

FIG. 2 illustrates an embodiment of a hardware configuration of a computer system 107 (FIG. 1) which is representative of a hardware environment for practicing the present invention. Computer system 107 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 may include, for example, a database management system. In another example, application 204 may include application 109 (FIG. 1), referred to herein as the "data copying application," that is platform agnostic that ensures that archival data deleted in source table 102 (FIG. 1) is already stored in target table 103 (FIG. 1) while performing synchronization between source table 102 and target table 103 in an efficient manner that minimizes the contention at source table 102, as discussed further below in association with FIGS. 3-7.

Referring to FIG. 2, Read-Only Memory (ROM) 205 may be coupled to system bus 202 and include a basic input/output system ("BIOS") that controls certain basic functions of computer system 107. Random access memory (RAM) 206 and disk adapter 207 may also be coupled to system bus 202. It should be noted that software components including operating system 203 and application 204 may be loaded into RAM 206, which may be computer system's 107 main memory for execution. Disk adapter 207 may be an integrated drive electronics ("IDE") adapter that communicates with a disk unit 208, e.g., disk drive. It is noted that program 109 used for ensuring that archival data deleted in source table 102 is already stored in target table 103, as discussed below in association with FIGS. 3-7, may reside in disk unit 208 or in application 204.

Referring to FIG. 2, computer system 107 may further include a communications adapter 209 coupled to bus 202. Communications adapter 209 may interconnect bus 202 with an outside network (not shown) enabling computer system 107 to communicate with other such devices.

I/O devices may also be connected to computer system 107 via a user interface adapter 222 and a display adapter 236. Keyboard 224, mouse 226 and speaker 230 may all be interconnected to bus 202 through user interface adapter 222. Data may be inputted to computer system 107 through any of these devices. A display monitor 238 may be connected to system bus 202 by display adapter 236. In this manner, a user is capable of inputting to computer system 107 through keyboard 224 or mouse 226 and receiving output from computer system 107 via display 238 or speaker 230.

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, and optical data storage devices. The computer readable medium can also be distributed over network-coupled computer systems so that the computer readable code is stored and executed in a distributed fashion.

As stated in the Background Information section, when a row(s) of archival data is deleted from the source table during synchronization methods discussed in the Background Information section, the archival data stored in the deleted rows may not have already been stored in the target table. That is, archival data may be deleted from the source table prior to being stored in the target table thereby preventing the target table from storing the archival data. Therefore, there is a need in the art to ensure that the data deleted in the relational source table is already stored in the relational target table.

Figure 3:
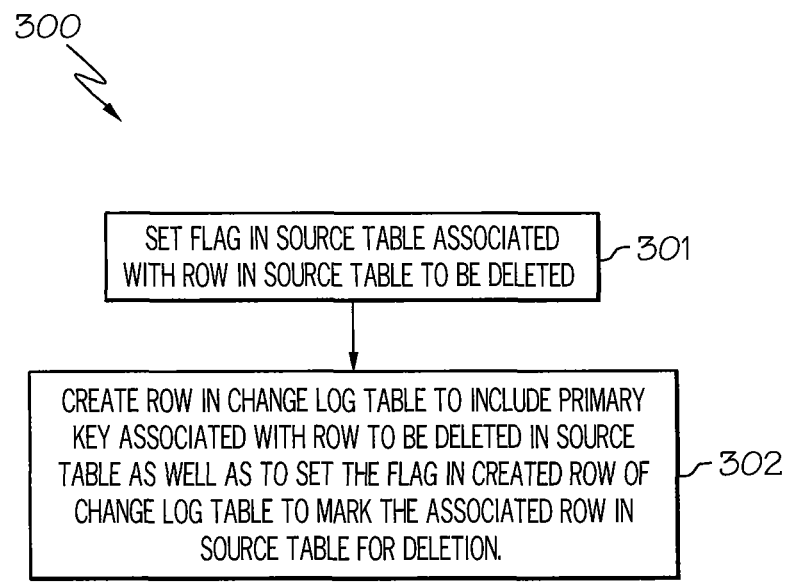
FIG. 3 is a flowchart of a method for an external data source indicating the deletion of a row in a source table in accordance with an embodiment of the present invention.
Figure 5:
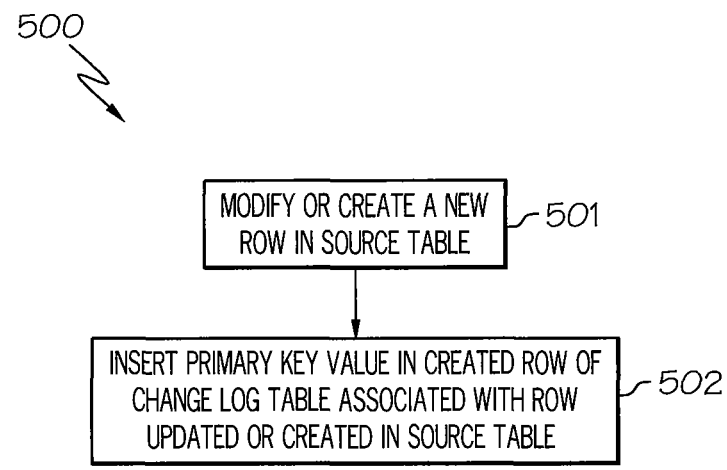
FIG. 5 is a flowchart of a method for an external data source indicating the modification or creation of a row in a source table in accordance with an embodiment of the present invention.
Figure 4:
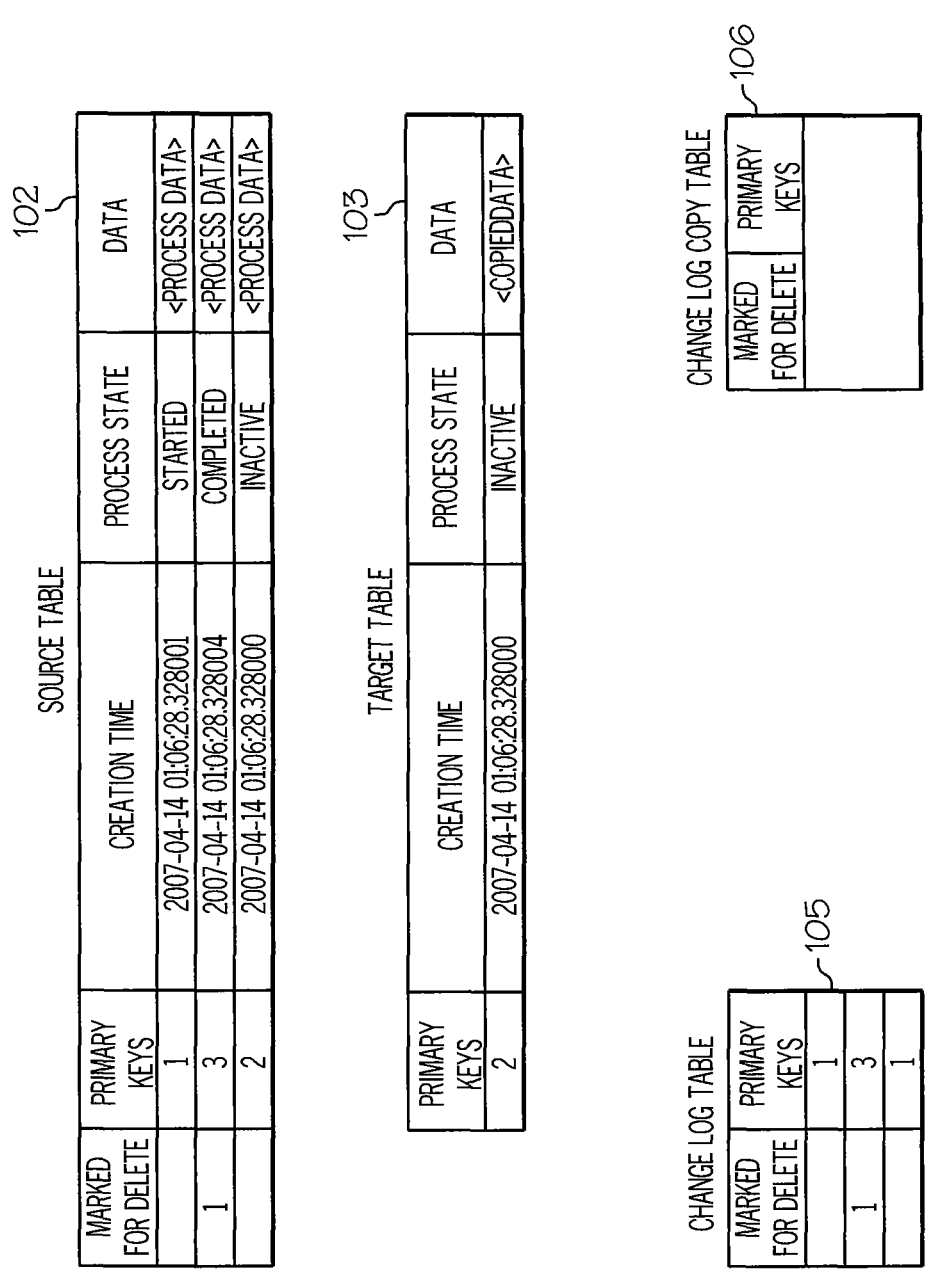
FIG. 4 is an illustrative example of the contents stored in the source table, the target table, the change log table and the change log copy table when the external data source indicates the modification, creation or deletion of a row in the source table in accordance with an embodiment of the present invention.
Figure 6A:
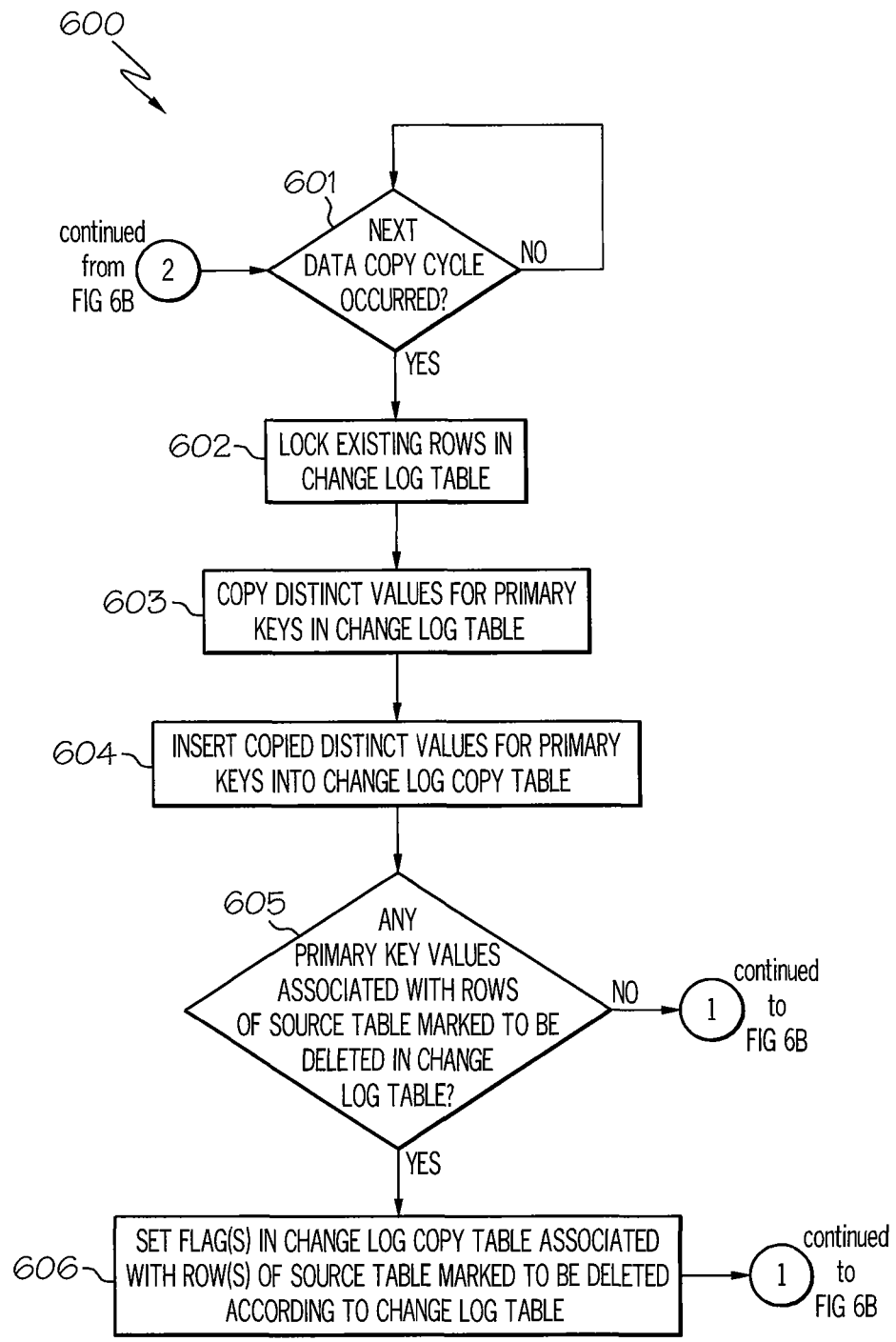
FIGS. 6A-6B are a flowchart of a method for ensuring that archived data in the source table is already stored in the target table while performing synchronization between the source table and the target table in accordance with an embodiment of the present invention.
Figure 6B:
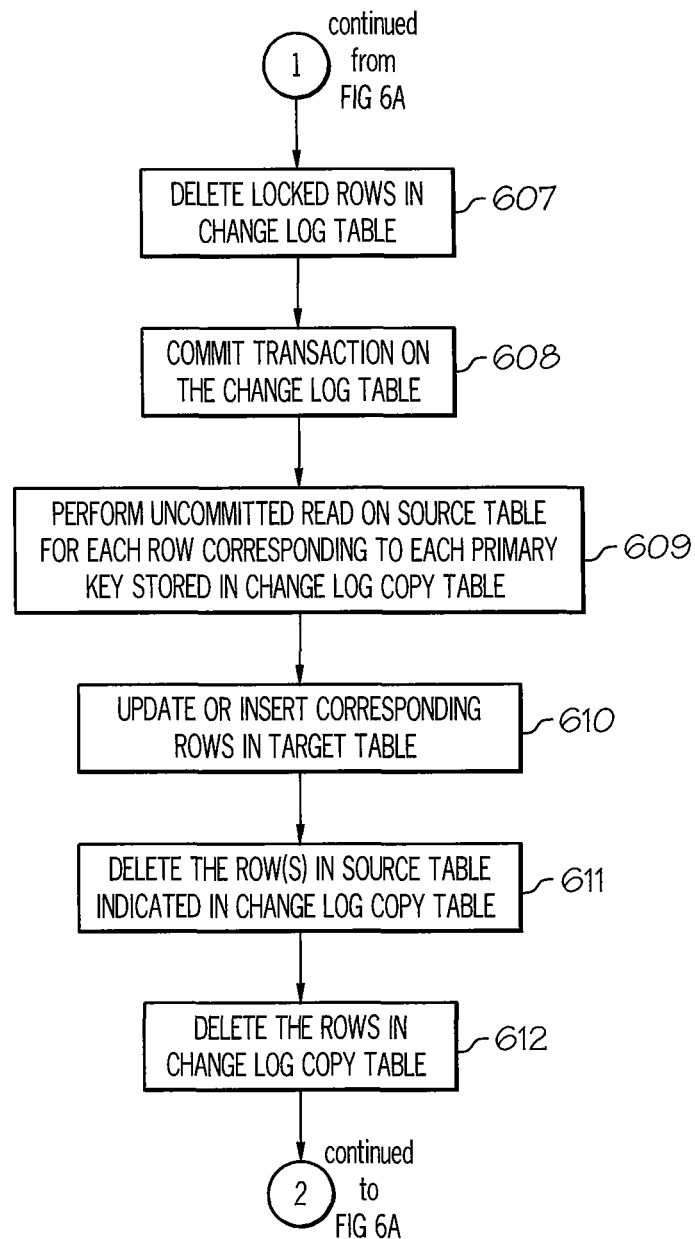

Application 109, referred to herein as the "data copy application," that is platform agnostic that ensures that archival data deleted in source table 102 is already stored in target table 103 while performing synchronization between source table 102 and target table 103, is discussed below in association with FIGS. 3-5, FIGS. 6A-B, and FIG. 7. FIG. 3 is a flowchart of a method for external data source 104 indicating the deletion of a row in source table 102. FIG. 5 is a flowchart of a method for external data source 104 indicating the modification or creation of a row in source table 102. FIG. 4 is an illustrative example of the contents stored in source table 102, target table 103, change log table 105 and change log copy table 106 when external data source 104 indicates the modification, creation or deletion of a row in source table 102. FIGS. 6A-B are a flowchart of a method for ensuring that archival data deleted in source table 102 is already stored in target table 103 while performing synchronization between source table 102 and target table 103. FIG. 7 is an illustrative example of the contents stored in source table 102, target table 103, change log table 105 and change log copy table 106 during the execution of the method of FIGS. 6A-B.

FIG. 3—Method for External Data Source Indicating the Deletion of a Row in Source Table FIG. 3 is a method 300 for external data source 104 (FIG. 1) indicating the deletion of a row in source table 102 (FIG. 1) in accordance with an embodiment of the present invention.

Referring to FIG. 3, in conjunction with FIGS. 1-2, in optional step 301, external data source 104 (e.g., online order application) sets a flag in source table 102 associated with the row in source table 102 to be deleted. External data source 104 may set a flag in source table 102 to indicate that the associated row is to be deleted in order that external data sources will not access that row in the future. It is noted for clarity that step 301 is optional for practicing the present invention. An illustration of external data source 104 setting a flag in source table 102 associated with the row in source table 102 to be deleted is provided in FIG. 4.

FIG. 4 is an illustrative example of the contents stored in source table 102, target table 103, change log table 105 and change log copy table 106 when external data source 104 indicates the modification, creation or deletion of a row in source table 102 in accordance with an embodiment of the present invention. Referring to FIG. 4, source table 102 may include multiple rows where each row stores an indication as to whether the row is to be deleted (column designated as "marked for delete"). For example, when a row is set to be deleted, external data source 104 may set a flag (i.e., insert a logical value of "1") in the row to be deleted under the column designated as "marked for delete." If a row is not set to be deleted, there will remain a null value for that row under the column designated as "marked for delete." For instance, the row in source table 102 associated with primary key #3 is designated to be deleted by external data source 104.

Referring again to FIG. 4, each row in source table 102 may further store a unique "primary key" value (discussed further below), the time data was stored in the row associated with the primary key value (designated as "creation time"), the state of the modification or creation of the row (designated as "process state") and the data stored for that row (designated as "<processdata>" for illustrative purposes). For example, the row in source table 102 associated with primary key #1 is currently having data modified or created in that row which was started at Apr. 14, 2007 at 01:06:28.328001.

Referring again to FIG. 4, target table 103, which is a table that serves as a back-up to source table 102, includes at least a portion of the data stored in source table 102. Target table 103 may not include all of the up-to-date information stored in source table 102 as target table 103 is updated at particular intervals. That is, target table 103 is synchronized with source table 102 at particular intervals, selected by a user. For instance, there is a row in target table 103 that includes a copy of the data (designated as "<copieddata>" for illustrative purposes) stored in the row in source table 102 associated with primary key #2. Target table 103 does not include the rows of data in source table 102 associated with primary keys #1 and #3.

Returning to FIG. 3, in conjunction with FIGS. 1-2, in step 302, external data source 104 creates a new row in change log table 105 to indicate the row in source table 102 is to be deleted. External data source 104 inserts the primary key value in the created row in change log table 105 associated with the row to be deleted in source table 102 as well as sets a flag in the created row in change log table 105 associated with the row to be deleted in source table 102. For example, referring to FIG. 4, change log table 105 may include a column designated as "marked for delete" where external data source 104 sets a flag (i.e., insert a logical value of "1") in the row to be deleted under the column designated as "marked for delete." As illustrated in FIG. 4, the row associated with primary key #3 is marked to be deleted by external data source 104. In this case, external data source 104 created a row in change log table 105 to include primary key #3 as well as to set the flag to mark the associated row in source table 102 for deletion. As discussed below in connection FIG. 5, if a row is not set to be deleted, such as when external data source 104 modifies/creates a row in source table 102, there will remain a null value for that row under the column designated as "marked for delete."

As further illustrated in FIG. 4, change log copy table 106 also includes a column designated as "marked for delete." Change log copy table 106 does not currently indicate any rows to be deleted in source table 102.

It is noted that method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted (e.g., step 301).

A description of external data source 104 indicating the modification or creation of a row in source table 102 will now be discussed in connection with FIG. 5.

FIG. 5—Method for External Data Source Indicating the Modification or Creation of a Row in Source Table FIG. 5 is a method 500 for external data source 104 (FIG. 1) indicating the deletion of a row in source table 102 (FIG. 1) in accordance with an embodiment of the present invention.

Referring to FIG. 5, in conjunction with FIGS. 1-2, in step 501, external data source 104 (e.g., online order application) modifies or creates a new row in source table 102. For example, external data source 104 may populate a row in source table 102 to include the product purchased by a buyer, the purchase price, the buyer's address, the buyer's credit card, etc. The row populated with data by external data source 104 may be associated with a process identification referred to herein as a "primary key value." That is, each row in source table 102 may be associated with a unique primary key value. For example, row #1 in source table 102 may be associated with primary key #1.

In step 502, external data source 104 indicates in change log table 105 the row updated in source table 102 by inserting a primary key value associated with the modified/created row in source table 102 in a new row of change log table 105. That is, external data source 104 creates a new row in change log table 105 as each row in source table 102 has been modified or created by external data source 104. A primary key value is inserted by external data source 104 in each new row created in change log table 105 that corresponds to the row modified or created in source table 102. An illustration of external data source 104 indicating in change log table 105 the row updated in source table 102 is provided in FIG. 4.

Referring to FIG. 4, change log table 105 includes the listing of the primary key values associated with the rows updated in source table 102 since the last time target table 103 was updated to be synchronized with source table 102. As illustrated in FIG. 4, change log table 105 includes an indication that the row in source table 102 associated with primary key #1 was modified/created twice. Each time a row in source table 102 is updated (including modified and created), external data source 104 creates a new row (e.g., a new row is created at the bottom of change log table 105) and inserts the primary key value associated with the row in source table 102 updated. As illustrated in FIG. 4, a particular row (e.g., row associated with primary key #1) in source table 102 may be updated multiple times from the last time that target table 103 is updated. It is noted that external data source 104 does not lock change log table 105 (i.e., prevent another application from accessing change log table 105) since external data source 104 creates new rows and does not modify existing rows. External data source 104 does, however, lock the rows in source table 102 as external data source 104 modifies or creates a row in source table 102.

As further illustrated in FIG. 4, change log copy table 106 does not currently list any primary key values at this point in the synchronization process.

A description of the synchronization process between source table 102 and target table 103 that ensures that archival data deleted in source table 102 is already stored in target table 103 is provided below in association with FIGS. 6A-B.

It is noted that method 500 may include other and/or additional steps that, for clarity, are not depicted. Further, method 500 may be executed in a different order presented and that the order presented in the discussion of FIG. 5 is illustrative. Additionally, certain steps in method 500 may be executed in a substantially simultaneous manner or may be omitted.

FIGS. 6A-B—Method for Ensuring Archived Data Deleted in Source Table is Already Stored in Target Table while Performing Synchronization Between Source and Target Tables FIGS. 6A-B are a method 600 for ensuring that archived data deleted in source table 102 (FIG. 1) is already stored in target table 103 (FIG. 1) while performing synchronization between source table 102 and target table 103 in accordance with an embodiment of the present invention.

Referring to FIG. 6A, in conjunction with FIGS. 1-2 and 4, in step 601, data copy application 109 determines whether the next "data copy cycle" has occurred. At each "data copy cycle" (data copy cycles may occur at particular intervals selected by the user), data copy application 109 synchronizes source table 102 and target table 103 as discussed below.

If, at the moment, the next data copy cycle has not occurred, then data copy application 109 determines again whether the next data copy cycle has occurred at step 601.

If, however, the next data copy cycle has occurred, then, in step 602, data copy application 109 locks the existing rows in change log table 105. For example, referring to FIG. 4, data copy application 109 locks the three rows of change log table 105 that includes the listing of primary keys #1, #3 and #1.

In step 603, data copy application 109 copies the distinct values for the primary keys in change log table 105. That is, data copy application 109 copies the values corresponding to each of the unique primary keys listed in change log table 105. If a primary key value is listed more than once, then data copy application 109 only copies that primary key value once.

While both external data source 104 and data copy application 109 access change log table 105, there is no contention since external data source 104 inserts new rows in change log table 105 and data copy application 109 copies the distinct values for the primary keys currently listed in change log table 105. That is, there is no contention at change log table 105 since data copy application 109 is interested in the existing rows; whereas, external data source 104 is interested in inserting new rows.

In step 604, data copy application 109 inserts the copied distinct values for the primary keys into change log copy table 106. For example, as illustrated in FIG. 7, data copy application 109 copies the distinct values for primary keys #1 and #3 into change log copy table 106.

FIG. 7 is an illustrative example of the contents stored in source table 102, target table 103, change log table 105 and change log copy table 106 during the synchronization process described in method 600 in accordance with an embodiment of the present invention. FIG. 7 is the same as FIG. 4 except for the differences which are discussed herein in connection with method 600.

Referring to FIG. 7, in connection with step 604, data copy application 109 creates two new rows in change log copy table 106 to store the primary key values of #1 and #3.

Returning to FIG. 6A, in connection with FIGS. 1-2 and 4, in step 605, data copy application 109 determines whether any of the primary key values inserted in change log copy table 106 are associated with rows of source table 102 marked to be deleted in change log table 105. If there are primary key values inserted in change log copy table 106 that are associated with rows of source table 102 marked to be deleted in change log table 105, then, in step 606, data copy application 109 sets the flag(s) in change log copy table 106 associated with the row(s) of source table 102 marked to be deleted according to the change log table 105. For example, referring to FIG. 7, data copy application 109 sets a flag (i.e., insert a logical value of "1" under the column entitled "marked for delete") in the row associated with primary key #3 thereby indicating that the row associated with primary key #3 in source table 102 is to be deleted.

Referring to FIG. 6B, in conjunction with FIGS. 1-2 and 4, upon execution of step 606, or, alternatively, if there are no primary key values inserted in change log copy table 106 that are associated with rows of source table 102 marked to be deleted in change log table 105, then, in step 607, data copy application 109 deletes the locked rows in change log table 105. In step 608, data copy application 109 commits the transaction on the change log table 105. "Committing," as used herein, may refer to data copy application 109 deleting the locked rows in change log table 105 in such a manner that other applications will not be able to read these deleted rows. That is, the deleted rows have effectively been purged from the system.

In step 609, data copy application 109 performs an uncommitted read (e.g., such as using queries from the Structured Query Language (SQL)) on source table 102 for each row corresponding to the primary key value stored in change log copy table 106. For example, referring to FIG. 7, data copy application 109 performs an uncommitted read on source table 102 for the rows corresponding to the primary key values of #1 and #3 as indicated in change log copy table 106. An "uncommitted read," as used herein, may refer to performing a read without locking the table. An "uncommitted read" does not prevent the row that was read from being modified again. By performing uncommitted reads on source table 102, there is no contention on source table 102 between external data source 104 and data copy application 109. Performing uncommitted reads on source table 102 should be acceptable as every modification or creation of a row in source table 102 is indicated by external data source 104 in change log table 105. Hence, if the data that is read from source table 102 is later modified, external data source 104 will indicate that a modification was made to that row in change log table 105. Data copy application 109 will then perform a subsequent uncommitted read for that row in source table 102 during the next data copy cycle and update target table 103 with the data read as discussed further below. In this manner, a platform agnostic application (data copy application 109) may be able to synchronize source and target tables 102, 103 in an efficient manner while minimizing the contention at source table 102.

If, however, performing uncommitted reads is unacceptable, data copy application 109 may perform a committed read for each row to be read from source table 102. A committed read does involve the locking of the table and, therefore, contention could occur if external data source 104 attempted to access source table 102 while data copy application 109 was performing a committed read from source table 102. If committed reads are performed row by row, the time that source table 102 is locked should be minimal thereby minimizing the contention.

In step 610, data copy application 109 updates or inserts (in case the row does not already exist) the corresponding rows in target table 103. That is, data copy application 109 inserts the data read in step 609 in the rows of target table 103 (including creating corresponding rows in target table 103 to store the data read in step 609) that correspond to the same rows read in source table 102 in step 609. For example, as illustrated in FIG. 7, target table 103 now includes the data in source table 102 from the rows corresponding to the primary key values of #1 and #3 thereby synchronizing target table 103 with source table 102.

In step 611, data copy application 109 deletes the row(s) in source table 102 indicated in change log copy table 106 to be deleted. For example, referring to FIG. 7, the row in source table 102 associated with primary key #3 has been deleted. Further, the deleted row in source table 102 associated with primary key #3 is contained within target table 103. The deleted row in source table 102 associated with primary key #3 was stored in target table 103 in step 610. Hence, method 600 ensures that the data (e.g., archival data) deleted in source table 102 is already stored in target table 103.

Returning to FIG. 6B, in conjunction with FIGS. 1-2 and 4, in step 612, data copy application 109 deletes the rows in change log copy table 106. Upon deleting the rows in change log copy table 106, data copy application 109 determines again whether the next data copy cycle has occurred at step 601.

Method 600 may include other and/or additional steps that, for clarity, are not depicted. Further, method 600 may be executed in a different order presented and that the order presented in the discussion of FIGS. 6A-B is illustrative. Additionally, certain steps in method 600 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for ensuring that archival data deleted in a source table is already stored in a target table, the method comprising the steps of:
    locking one or more rows in a first table, wherein said first table stores one or more primary key values associated with one or more rows in said source table that have been one of modified and created by an external data source, wherein said first table further stores an indication of deleting one or more rows in said source table associated with one or more of said one or more primary key values;
    copying distinct values for said one or more primary keys from said first table;
    inserting said copied distinct values for said one or more primary keys into one or more rows of a second table;
    setting one or more flags in said second table associated with said one or more rows in said source table to be deleted according to said first table; and
    deleting said one or more rows in said source table indicated by said second table according to said setting of said one or more flags.

2. The method as recited in claim 1 further comprising the steps of:
    performing uncommitted read operations on said source table for each row corresponding to each distinct value stored in said second table; and
    one or more of updating and inserting of one or more rows in said target table that correspond to each row in said source table where an uncommitted read operation was performed.

3. The method as recited in claim 1 further comprising the steps of:
    deleting said locked one or more rows in said first table; and
    committing transaction on said first table.

4. The method as recited in claim 1 further comprising the step of:
    deleting said one or more rows of said second table.

5. The method as recited in claim 1, wherein said external data source sets a flag in said source table associated with a row in said source table to be deleted.

6. The method as recited in claim 1, wherein said external data source sets one or more flags in said first table associated with said one or more rows in said source table to be deleted.

7. The method as recited in claim 1, wherein said external data source inserts said one or more primary key values in said first table associated with said one or more rows in said source table that have been one of modified and created by said external data source.

8. A system, comprising:
    a memory unit for storing a computer program for ensuring that archival data deleted in a source table is already stored in a target table; and
    a processor coupled to said memory unit, wherein said processor, responsive to said computer program, comprises:
        circuitry for locking one or more rows in a first table, wherein said first table stores one or more primary key values associated with one or more rows in said source table that have been one of modified and created by an external data source, wherein said first table further stores an indication of deleting one or more rows in said source table associated with one or more of said one or more primary key values;
        circuitry for copying distinct values for said one or more primary keys from said first table;
        circuitry for inserting said copied distinct values for said one or more primary keys into one or more rows of a second table;
        circuitry for setting one or more flags in said second table associated with said one or more rows in said source table to be deleted according to said first table; and
        circuitry for deleting said one or more rows in said source table indicated by said second table according to said setting of said one or more flags.

9. The system as recited in claim 8, wherein said processor further comprises:
    circuitry for performing uncommitted read operations on said source table for each row corresponding to each distinct value stored in said second table; and
    circuitry for one or more of updating and inserting of one or more rows in said target table that correspond to each row in said source table where an uncommitted read operation was performed.

10. The system as recited in claim 8, wherein said processor further comprises:
    circuitry for deleting said locked one or more rows in said first table; and
    circuitry for committing transaction on said first table.

11. The system as recited in claim 8, wherein said processor further comprises:
    circuitry for deleting said one or more rows of said second table.

12. The system as recited in claim 8, wherein said external data source sets a flag in said source table associated with a row in said source table to be deleted.

13. The system as recited in claim 8, wherein said external data source sets one or more flags in said first table associated with said one or more rows in said source table to be deleted.

14. The system as recited in claim 8, wherein said external data source inserts said one or more primary key values in said first table associated with said one or more rows in said source table that have been one of modified and created by said external data source.

15. A computer program product embodied in a non-transitory computer readable medium for ensuring that archival data deleted in a source table is already stored in a target table, the computer program product comprising the programming steps of:
    locking one or more rows in a first table, wherein said first table stores one or more primary key values associated with one or more rows in said source table that have been one of modified and created by an external data source, wherein said first table further stores an indication of deleting one or more rows in said source table associated with one or more of said one or more primary key values;

copying distinct values for said one or more primary keys from said first table;

inserting said copied distinct values for said one or more primary keys into one or more rows of a second table;

setting one or more flags in said second table associated with said one or more rows in said source table to be deleted according to said first table; and deleting said one or more rows in said source table indicated by said second table according to said setting of said one or more flags.

16. The computer program product as recited in claim 15 further comprising the programming steps of:

performing uncommitted read operations on said source table for each row corresponding to each distinct value stored in said second table; and one or more of updating and inserting of one or more rows in said target table that correspond to each row in said source table where an uncommitted read operation was performed.

17. The computer program product as recited in claim 15 further comprising the programming steps of:

deleting said locked one or more rows in said first table; and committing transaction on said first table.

18. The computer program product as recited in claim 15 further comprising the programming step of:

deleting said one or more rows of said second table.

19. The computer program product as recited in claim 15, wherein said external data source sets a flag in said source table associated with a row in said source table to be deleted.

20. The computer program product as recited in claim 15, wherein said external data source sets one or more flags in said first table associated with said one or more rows in said source table to be deleted.

\* \* \* \* \*